Patented Aug. 9, 1949

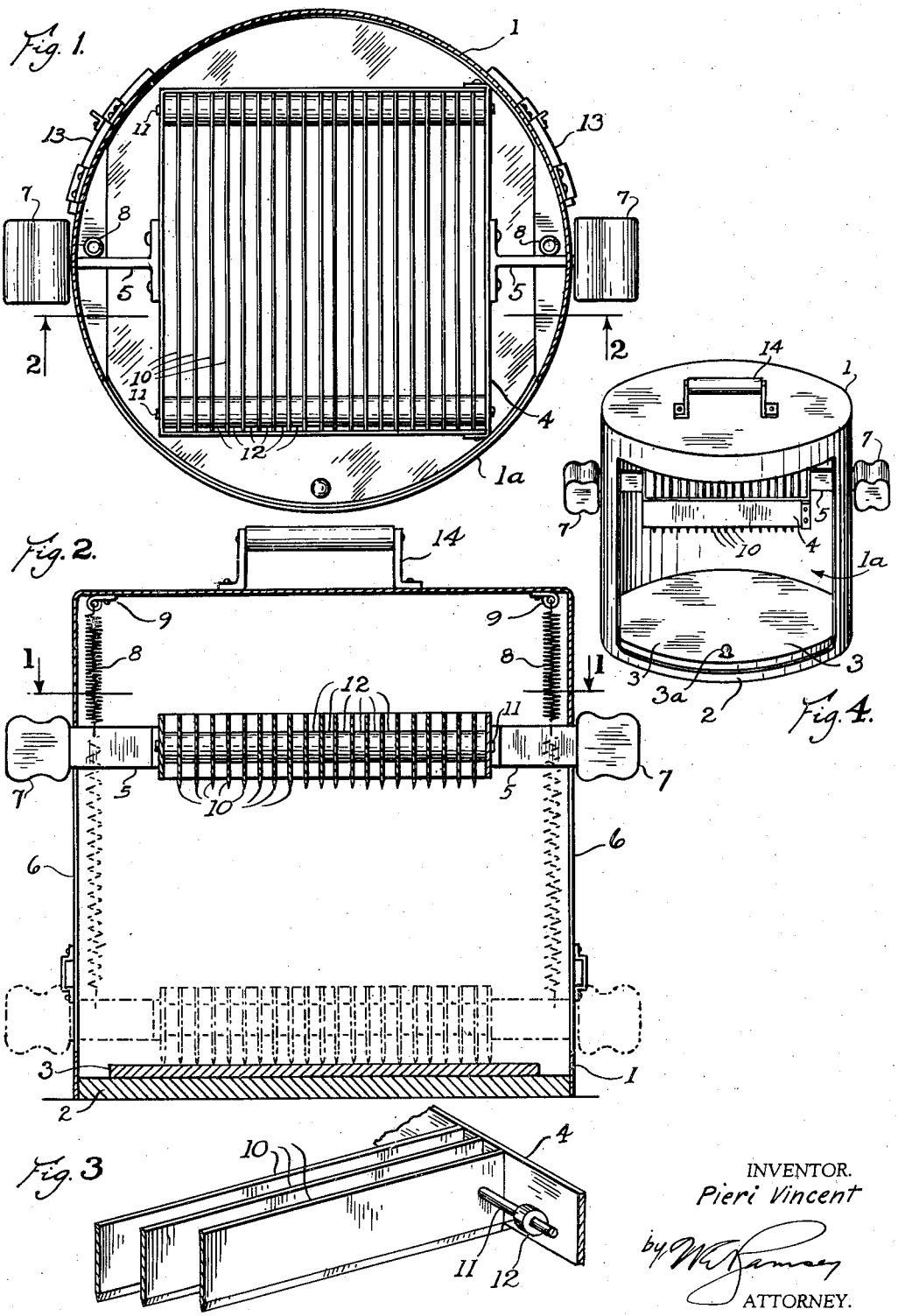

2,478,515

UNITED STATES PATENT OFFICE 2,478,515

POTATO SLICER

Pieri Vincent, Portland, Oreg.

Application October 3, 1945, Serial No. 619,975

4 Claims. (Cl. 146—160)

The object of my invention is to provide a device to be used in the kitchen which easily and quickly cuts potatoes into size for French-fried potatoes or cuts cabbage into cole slaw and performs other similar operations in an efficient manner. Said device is particularly adapted for use in hotels and restaurants where said operations must be carried on efficiently with large quantities of food.

The details of my invention are hereinafter described with reference to the accompanying drawings in which:

Fig. 1 is a horizontal sectional view of the said device taken on the line 1—1 in Figure 2;

Fig. 2 is a longitudinal sectional view through said device taken on the line 2—2 in Figure 1;

Fig. 3 is a perspective detail of a portion of the cutting head of said device showing the manner in which blades may be removably mounted; and Fig. 4 is a perspective view of said device, shown on a smaller scale, illustrating the manner in which it works.

A device embodying my invention comprises a container 1, preferably cylindrical in form. It has one portion 1a open to provide access to the interior thereof. The remainder is preferably imperforate except for slots, which will hereinafter be described. This thus prevents juices of vegetables or fruits from squirting out of said container when they are being cut or shredded. The floor 2 of said container preferably is made of wood so that it may serve as a cutting board. Overlying said floor is a removable tray 3 which may be inserted or removed at will and also serves as a cutting board. A protuberant knob 3a extends upwardly from the upper surface of said tray so as to aid in its manipulation.

Knife holder 4, comprising a frame, is carried by two arms 5 which extend through slots 6 in the container. Said arms have knobs 7 at the ends thereof to serve as convenient grips. Said knife holder is resiliently mounted in said container, preferably being supported by a pair of spaced coiled springs 8. Said springs are secured at their upper ends to pads or eyes 9 secured by the under surface of the top of the container. Said springs may be elongated, as outlined in Fig. 2, to move so that the sharpened edges of knives 10 may move into abutment with the tray 3 or, if it is not in place, with the floor 2. Said knives preferably are held at their ends on pins 11, said knives being held apart by spacers 12. Thus the number of knives and their spacing may be adjusted to suit conditions.

If it is desired to hold the knife holder and the frames at the bottom of its stroke, as shown in dotted lines in Fig. 2, a pair of catches 13 may be moved in their holders to overlie the knobs 7. It might be desirable to hold said knives down to aid in cleaning them or to perform some operation by locking the knives and pulling the tray 3 back and forth beneath them.

The container is provided with a handle 14 for lifting it and shifting it about.

When this device is to be used for slicing potatoes, so they may be made into French-fried potatoes for example, the knife holder is pushed down firmly through one or more potatoes lying on the upper surface of tray 3. This severs them into slives. The slices can then be cut by arranging the slices normal to the plane of the blades. The potato will then be cut into elongated square sections, each side being as wide as the spacing of the blades.

Attention is called to the fact that the base or floor 2 is not connected with the container 1 and that said container is cylindrical. That is, said container is free to rotate independently of said base or floor. Thus, in operation, in making cole slaw, for example, cabbage first can be cut with a series of parallel cuts. The housing may then be rotated and other cuts made which extend normal to the original ones, or obliquely with respect thereto, to cut cabbage or other vegetables into small cubes or irregular sized pieces. Likewise the container may be held stationary and the floor 2 may be rotated therein. I deem it more expedient, however, to rotate the container in performing this operation.

I claim:

1. Food cutting apparatus comprising a cylindrical container having an access aperture through one side wall thereof, a food cutter element reciprocally mounted in said container and having manipulating means extending exteriorly thereof, and a food supporting tray slidable laterally through said aperture and mounted at the bottom of said container, said tray being slabbed off at diametrically opposed sides so as to be slidable laterally through said aperture.

2. Food cutting apparatus comprising a cylindrical container having an access aperture through one side wall thereof, a food cutter element reciprocally mounted in said container and having manipulating means extending exteriorly thereof, and a food supporting tray slidable laterally through said aperture and mounted at the bottom of said container for rotation about an axis coinciding with the centerline of the cylindrical container, having a diameter approximating that of said cylindrical container and being slabbed off at diametrically opposed sides to have a width across said slabbed off sides corresponding to the width of said aperture so as to be slidable laterally therethrough.

3. Food cutting apparatus comprising a cylindrical container having an aperture through one side wall thereof, said aperture approximating the height of said container and the diametral width thereof, a food cutter element reciprocally mounted in said container and having manipulating means extending exteriorly thereof, and a food supporting tray rotatably mounted at the bottom of said container having a diameter approximating that of said cylindrical container and being slabbed off at diametrically opposed sides to have a width across said slabbed off sides corresponding to the width of said aperture so as to be slidable laterally therethrough.

4. Food cutting apparatus comprising a cylindrical container having an aperture through one side wall thereof and a removable closure element therefor, said aperture approximating the height of said container and the diametral width thereof, a food cutter element reciprocally mounted in said container and having manipulating means extending exteriorly thereof, and a food supporting tray rotatably mounted at the bottom of said container having a diameter approximating that of said cylindrical container and being slabbed off at diametrically opposed sides to have a width across said slabbed off sides corresponding to the width of said aperture so as to be slidable laterally therethrough.

PIERI VINCENT.

REFERENCES CITED

The following references are of record in the file of this patent:

UNITED STATES PATENTS

| Number | Name | Date |
|---|---|---|
| 461,821 | Edwards | Oct. 27, 1891 |
| 937,611 | Kawasaki | Oct. 19, 1909 |
| 1,369,548 | Rullo | Feb. 22, 1921 |
| 1,685,700 | Kulenkampff | Sept. 25, 1928 |
| 2,219,963 | Rieder | Oct. 29, 1940 |

FOREIGN PATENTS

| Number | Country | Date |
|---|---|---|
| 204,626 | Germany | Nov. 30, 1908 |
| 208,113 | Germany | Mar. 20, 1909 |